United States Patent [19]

Villa et al.

[11] Patent Number: 4,984,843

[45] Date of Patent: Jan. 15, 1991

[54] AUTOMOBILE SEAL AND TRIMMING GASKET

[75] Inventors: Ezio Villa, Milan; Giuseppe Biazzi, Varese; Giorgio Guelfi, Milan, all of Italy

[73] Assignee: Alfa Lancia S.p.A., Milan, Italy

[21] Appl. No.: 445,115

[22] Filed: Nov. 30, 1989

Related U.S. Application Data

[63] Continuation of Ser. No. 230,199, Aug. 9, 1988, abandoned.

[30] Foreign Application Priority Data

Aug. 14, 1987 [IT] Italy ................... 21666 A/87

[51] Int. Cl.[5] ............................... B60R 13/06
[52] U.S. Cl. ............................ 296/213; 296/154; 49/476; 49/485; 49/495
[58] Field of Search ............... 270/199; 296/208, 213, 296/154; 49/476, 485, 495

[56] References Cited

U.S. PATENT DOCUMENTS

| | | | |
|---|---|---|---|
| 2,684,508 | 7/1954 | Meyers et al. | 49/489 |
| 3,327,429 | 6/1967 | Slaughter | 49/485 |

FOREIGN PATENT DOCUMENTS

| | | |
|---|---|---|
| 0022130 | 6/1980 | European Pat. Off. . |
| 0163991 | 12/1985 | European Pat. Off. . |
| 634860 | 9/1936 | Fed. Rep. of Germany . |
| 760116 | 3/1953 | Fed. Rep. of Germany . |
| 2580999 | 10/1986 | France . |
| 30640 | 2/1982 | Japan ................... 296/213 |
| 675687 | 7/1952 | United Kingdom ........... 49/495 |
| 1577312 | 10/1980 | United Kingdom . |
| 2060039 | 4/1981 | United Kingdom . |
| 2104008 | 3/1983 | United Kingdom . |

*Primary Examiner*—Dennis H. Pedder
*Attorney, Agent, or Firm*—Charles E. Brown; Charles A. Brown

[57] ABSTRACT

A seal and trimming gasket is proposed having a substantially $\omega$-shaped section, formed from a fixing web and two wings which are substantially of C-shaped section and are connected to the sides of the web. The free lips of the two wings are partly superposed so that on closing the door, the projecting lip of the first wing is lowered and is retained directly by the door edge and also by the projecting lip of the second wing, this lip also being bent by the door edge.

5 Claims, 1 Drawing Sheet

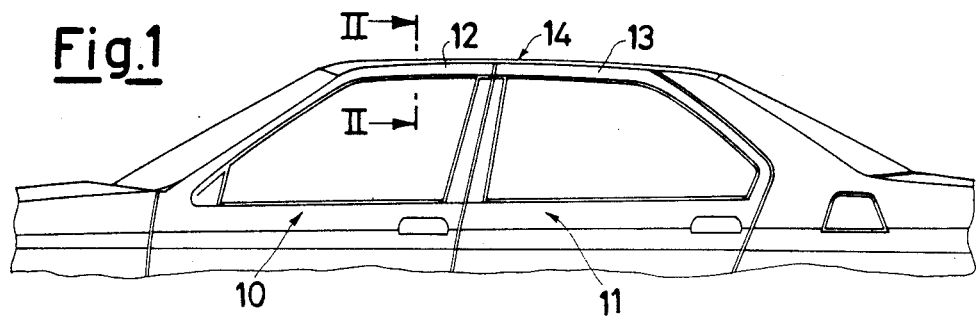
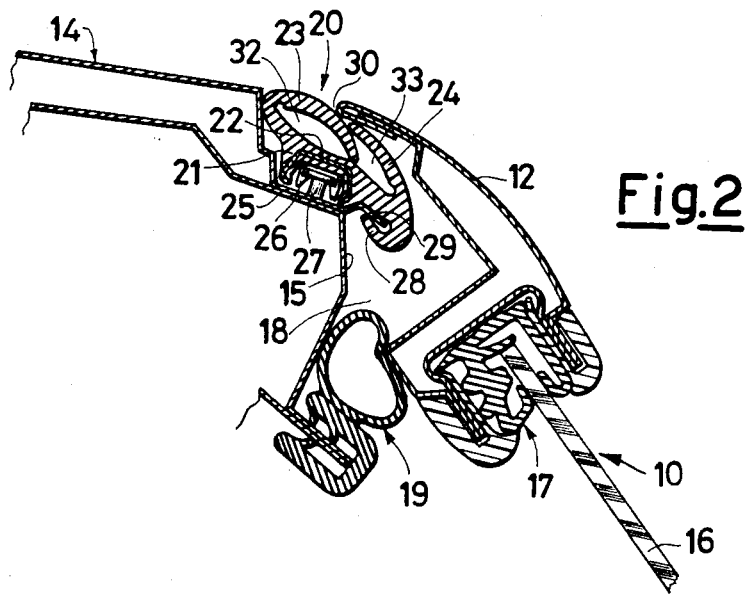
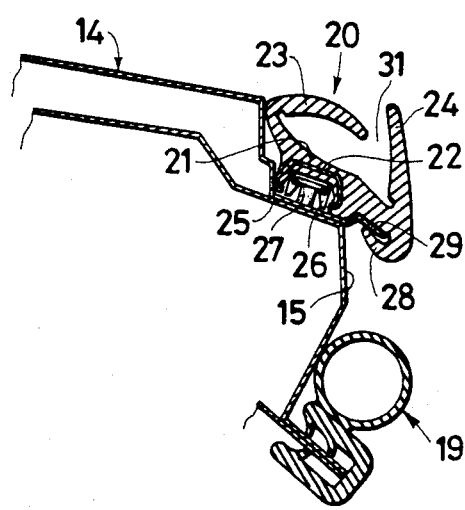

AUTOMOBILE SEAL AND TRIMMING GASKET

This application is a continuation, of application Ser. No. 230,199, filed Aug. 9, 1988, abandoned.

This invention relates to a profiled autobile gasket and in particular a seal and trimming gasket for the gaps between the door frames and door edges.

The main purpose of gaskets used on automobile openings, in particular the door openings, is to prevent undesirable air passage, which could be accompanied by the entry of dust, water and noise.

The gasket can also serve to mask spaces and gaps between metal panels and to form smoothly blending shapes. The choice of gaskets therefore requires careful study, because it influences the appearance of automobiles and their behaviour during running, as regards comfort and the aerodynamic drag coefficient (Cx).

This is particularly so in the case of door gaskets for those automobiles in which the doors do not penetrate or only partly penetrate into their frames, but instead have their upper edges either at the same level as the roof panel or slightly below it, and are streamlined so as to smoothly blend into and partly prolong the profile of the roof itself.

Generally, in automobiles of this type, spaces and relative gaps tend to appear between the roof and door upper edges and between the uprights and door side edges.

In some cases these spaces are used as water drainage channels and for this purpose are provided, at least at the bottom, with seal gaskets such as that described in U.S. Pat. No. 3,596,980. In other cases, gaskets are provided which mask the gaps when the doors are closed, and which form a water discharge channel when the doors are open, such as the gasket of substantially V-shaped section of French patent application 2,511,319.

The gasket proposed in the aforesaid French application is particularly simple and has no sealing problems. However, it is not entirely satisfactory from the comfort, aerodynamic or aesthetic aspect because the gap is closed by one wing of the V-shaped gasket which is bent by the door against the roof so as to adhere to the other wing.

With this conception it can happen that the bent wing projects from the roof and emerges beyond the smooth profile formed by the roof and door, for example if the manufacturing and assembly tolerances of the sheet metal panels and gasket are all in the same direction.

The consequent irregularities in the automobile profile, even if hardly relevant from the aesthetic aspect, cause an increase in aerodynamic drag and generation of disturbing background noise. The object of the present invention is to improve known gaskets by proposing a conception which is more satisfactory from the aerodynamic, comfort and aesthetic aspects.

A gasket is therefore proposed characterised by being of overall ω-shaped section, formed from a fixing web and two wings which are substantially of c-shaped section and are connected to the sides of said web.

In a preferred embodiment, a first wing is substantially of more closed C-shaped section and a second wing is substantially of more open C-shaped section, and the projecting lips of the two wings are partly superposed so that on closure of the door, the projecting lip of the first wing is lowered and is retained by the door edge, both directly and by way of the projecting second wing lip, which is also bent by the same door edge.

The gasket is mounted in proximity to the edge of the door frame, and when the door is closed the projecting lip of the first wing covers the gap between the door edge and uprights or roof, to remain within the overall outline of the sheet metal parts forming the doors, uprights and roof.

When the door is opened, the two lips of the wing are free to rise, so that that of the second wing forms a channel for discharging water originating from the roof or which has infiltrated into the gasket itself.

With this embodiment both the wings contribute to sealing, but the first also performs a trimming function, whereas the second also acts as a water discharge channel.

With this division of functions, and with the proposed embodiment, the first wing has the most suitable characteristics for improving the aerodynamic, comfort and aesthetic aspects of the automobile. Characteristics and advantages of the invention are illustrated hereinafter with reference to the accompanying FIGS. 1 to 3, which show a preferred embodiment of the invention by way of nonlimiting example.

FIG. 1 is a partial side view of an automobile provided with the proposed gasket;

FIG. 2 is a partial section on the line II—II of FIG. 1;

FIG. 3 is a view analogous to that of FIG. 2, with the door open

In FIG. 1, the doors of an automobile are indicated overall by 10 and 11, and their respective upper edges by 12 and 13. The automobile roof is indicated overall by 14.

As can be seen from FIG. 2, the automobile of FIG. 1 is of the type in which the doors 10 and 11 do not penetrate into the interior of their frame 15, but instead have their upper edges 12 and 13 at the level of the roof panel 14.

Of the door 10, the sliding glass pane 16 and its gasket indicated overall by 17 are partly visible. In the space 18 between the frame 15 and door edges there are mounted two gaskets, an inner gasket of usual type indicated overall by 19, and an outer gasket constructed in accordance with the invention and indicated overall by 20.

The gasket 20 is substantiall of ω-shaped overall section, and is formed from a fixing web 21 substantially of U-shaped section reinforced with a steel profile strip 22, and two wings 23 and 24 substantially of C-shaped section, which are connected to the sides of said web.

The C-shaped section of each wing 23 and 24 comprises a length having spaced ends with a curved section disposed between the spaced ends.

The gasket 20 is fixed to the joint between the sheet metal plates forming the roof 14 by means of usual spring clips 26 and pins 27. In addition, the wing 24 of the gasket 20 is provided with a bent lip 28 which further retains the gasket 20 on the sheet metal edge 29 of the roof 14.

As can be seen from FIGS. 2 and 3, the wing 23 is substantially of more closed C-shaped section, whereas the wing 24 is of substantially more open C-shaped section, so that the projecting lips of the two wings are partly superposed, even when the door 10 is open, as shown in FIG. 3.

When the door 10 is closed, as shown in FIG. 2 the projecting lip of the wing 23 is lowered and is retained by the door edge 12, both directly and by way of the projecting lip of the wing 24, this lip also being bent by the door.

Thus the projecting lip of the wing 23 covers the gap 30 between the roof 14 and edge 12 of the door 10, by moving to within the overall outline of the sheet metal parts of the roof and door edge.

When the door 10 is opened, the lips of the wings 23 and 24 are free to rise, the lip of the wing 24 forming a channel 31 for discharging the water which either originates from the roof or has infiltrated into the gasket.

Even when the door 10 is closed, any water which has infiltrated between the wing lips is discharged because tubular cavities 32 and 33 form between the web 21 and wings 23 and 24 to allow drainage.

Thus both the wings 23 and 24 are used for sealing, but the first also performs a trimming function whereas the second also serves as a water discharge channel.

Thus the problems of gasket functionality and the problems concerning the aerodynamic, comfort and aesthetic aspects of the automobile are solved satisfactorily through improvement in the aerodynamic drag coefficient and background noise elimination.

We claim:

1. A profiled sealing and trimming gasket for an automobile having a sheet metal roof defining a contour, said gasket being used to fill in gaps and spaces between door frames and door edges of the automobile, said gasket having an overall section, said section comprising a fixing web portion and two wings, said web portion having a recessed surface remote from said wings for engagement by mounting means, each wing having a curved section, each wing having a pair of spaced ends with the curved section positioned between the spaced ends, one of the spaced ends of each wing being attached to a side of said web portion whereby said wings are positioned opposite one another, the other of the spaced ends of each wing having a projecting lip, a first of said wings having an inner portion of its curved section positioned above said fixing web portion, a second of said wings having an inner portion of its curved section positioned at an angle to said web portion and spaced from the projecting lip of said first wing when said gasket is in an unloaded condition when the door of the automoibile is in an open position, the projecting lip of said second wing engaging the edge of the door in a loaded condition when the door is in a closed position and the door edge also contacting a portion of said first wing in the loaded condition wherein the projecting lip of said first wing is overlapped by said second wing, said second wing having its curved section protruding above a lateral extension of the roof contour when the door is in the open position and lying below the roof contour extension when the door is in the closed position.

2. A gasket as claimed in claim 1, wherein said gasket is mounted in proximity to an edge of a door frame, with the projecting lip of said first wing (23) arranged to cover the gap (30) between the door edge (12) and the roof (14), in order to remain within the overall profile of sheet metal parts forming the roof and door when the door is in the closed position.

3. A gasket as claimed in claim 1, wherein said second wing (24) is provided with a second lip (28) which is bent and arranged to retain said gasket (20) against an edge (29) of the roof sheet metal.

4. A gasket as claimed in claim 1, wherein tubular cavities (32 and 33) are formed between the web (21) and said wings (23 and 24) when the door (10) is closed.

5. A gasket as claimed in claim 1, wherein a channel (31) for water discharge is formed between the web (21) and said second wing (24) when the door (10) is open.

* * * * *